Feb. 20, 1940.   A. ARAUJO   2,190,640
COMPUTING SCALE
Filed June 2, 1938   4 Sheets-Sheet 1
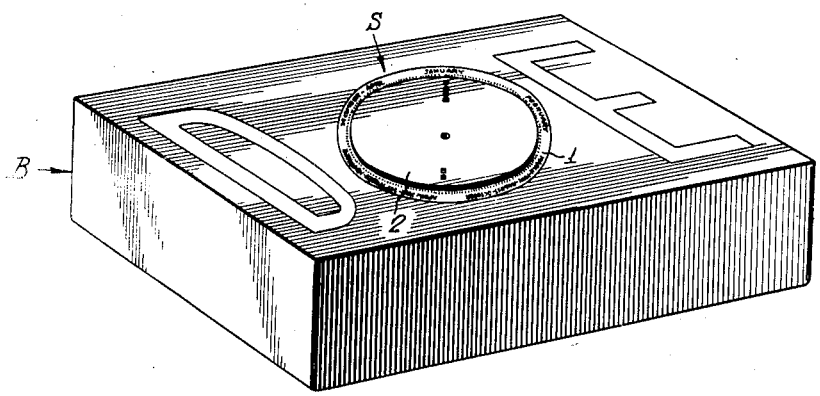
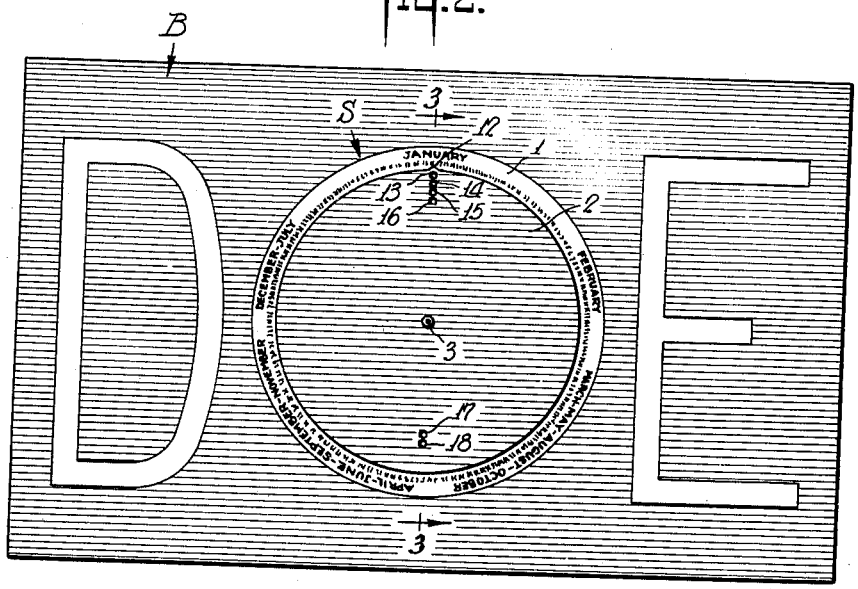
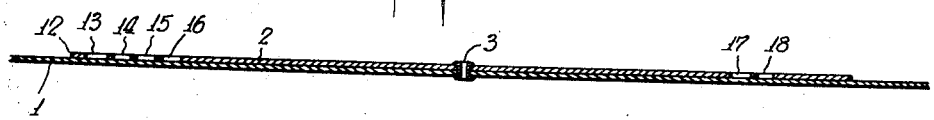
INVENTOR
*Armando Araujo*
BY
*Dean Fairbank & Hirsch*
ATTORNEYS Feb. 20, 1940.　　　A. ARAUJO　　　2,190,640
COMPUTING SCALE
Filed June 2, 1938　　　4 Sheets-Sheet 3

INVENTOR
*Armando Araujo*
BY
*Dean Fairbank & Hirsch*
ATTORNEYS

Feb. 20, 1940.   A. ARAUJO   2,190,640
COMPUTING SCALE
Filed June 2, 1938   4 Sheets-Sheet 4

INVENTOR
Armando Araujo
BY
ATTORNEYS

Patented Feb. 20, 1940

2,190,640

UNITED STATES PATENT OFFICE 2,190,640

COMPUTING SCALE

Armando Araujo, Merrick, N. Y.

Application June 2, 1938, Serial No. 211,469

5 Claims. (Cl. 40—113)

This invention relates to a circular scale for calculating the menstrual cycle and the periods of fertility and infertility of women.

Experiments and observations in the field of gynecology have established the existence of a period of fertility, during which ovulation takes place, some time between successive occurrences of the menses. The menstrual cycle is divided into two periods of sterility with a period of fertility therebetween.

The menstrual cycle and the time when ovulation occurs in relation to the menses varies for different women and varies somewhat from month to month in the same woman. These variable factors and the fact that spermatozoa remain viable for about two days after being deposited require that about four or five days be considered the fertile period, despite the fact that ovulation requires only a fraction of this time to actually occur. The mid-point of the fertile period is usually thirteen or fourteen days after the beginning of menstruation. The period of fertility is usually considered as being within a space of time two or three days on each side of this mid-point, that is, extending from the twelfth to the sixteenth day. If the period of menstruation varies and is apt to be slightly irregular, the fertile time may be considered from the eleventh to the seventeenth day after the menses start.

An object of the present invention is to produce a calculating scale which will indicate the time that the next period of menstruation may be expected to commence and the intervening period of fertility, both in relation to the time of commencement of the earlier menses.

Another object is to produce such a scale which is simple in construction and requires only one setting, that is, a setting on the date of the commencement of the present menses in order to indicate the date of the next menstruation and the intervening period of fertility.

Still another object is to produce such a simple calculating device constructed to accommodate itself to a leap year, a non-leap year or a combination scale for both.

A further object is to show such a scale as forming the letter "O" of a word used on a box such as a box for sanitary napkins, tampons or the like.

In the drawings:

Fig. 1 is a perspective view of a box or container showing the computing scale forming the letter "O" of the word on the box;

Fig. 2 is a plan view of the box;

Fig. 3 is a section through 3—3 of Fig. 2;

Figure 4:
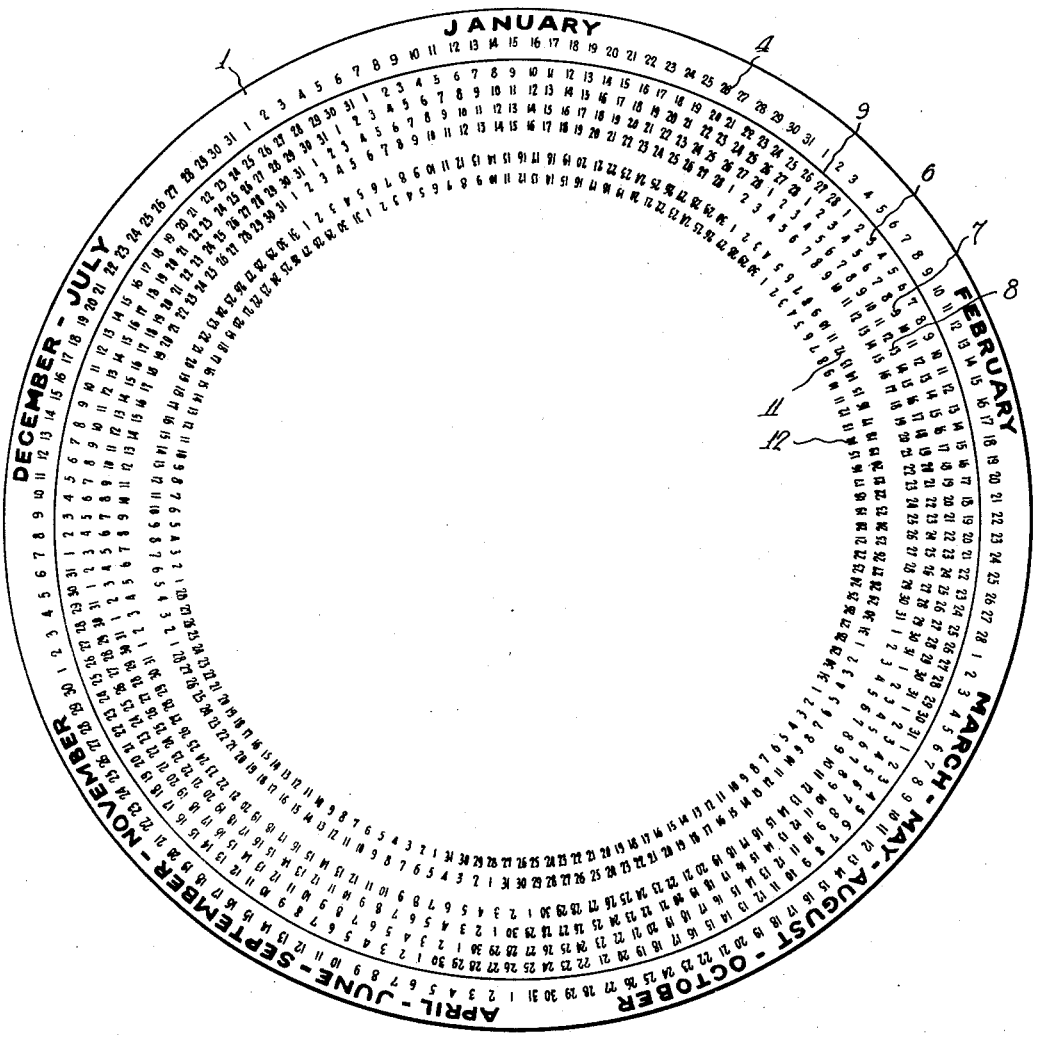
Fig. 4 is a plan view of the stationary disc of the scale showing the various rows of numbers thereon for a non-leap year.

The computing scale herein described may be used in combination with a box or container for sanitary napkins or the like, or it may be used separately. It is shown in some of the figures as combined with such a box, but it is to be understood that this invention is not limited to such a combination.

In the drawings the box or container, which may be of any suitable size or shape, is shown at B. On the top thereof, the scale is shown at S as forming the letter "O" of the word "DOE" which may be a trade-mark, the name of the manufacturer or any other conspicuous word on the box. The computing scale is made up of a stationary underneath portion in the form of a circle or disc, as shown at 1. When the device is incorporated as part of a box, this lower or stationary scale may be printed thereon. When it is not part of a box, it consists of a circular disc, such as that shown in Fig. 4. An upper movable disc 2 is attached to the lower disc by means of a rivet 3 passing through the centers of both discs and so arranged that the upper disc may rotate freely.

Looking at Fig. 4, which discloses the lower disc for a non-leap year with the upper disc removed so that the various rows of figures may be seen, it will be observed that the disc is divided into five quadrants. The quadrant near the top of the disc is for the month of January, the one immediately to the right is for the month of February and proceeding in a clockwise direction, the next quadrant is for the months of March, May, August and October, all thirty-one day months; and following this is the quadrant representing the months of April, June, September and November, all thirty day months. Finally, between the last mentioned quadrant and the first quadrant is arranged a quadrant for the months of December and July.

It will be seen that there are seven concentric rows of figures arranged in circles from a point near the periphery of the disc inwardly toward the center thereof. The outer row of figures, shown at 4, represents the dates for a whole year, that is, for a standard or non-leap year. When the movable disc 2 is attached to the lower disc 1, this outer row of figures is the only row which is completely visible because the diameter of the movable disc is smaller than the diameter of this outer row of figures. The row of figures immediately adjacent to the outside row nearest to the periphery and shown at 6 indicates the dates separated from the corresponding dates on the first mentioned row of twenty-six days. The third row of figures, shown at 7, indicates corresponding dates separated from the first row by twenty-eight days. The fourth row, shown at 8, indicates corresponding dates separated by thirty days and the fifth row, shown at 9, indicates corresponding dates separated from the first row by thirty-two days. It will be noticed that these figures are all arranged so that they are intended to be read near the top of the scale or chart and, when so read in that position, are right side up. These various rows of figures are intended to indicate the date of the next expected menstruation and each row is for a different length of cycle. Row 6, which is the second row of figures from the periphery, is for a cycle of twenty-six days, row 7 of twenty-eight days, row 8 of thirty days and row 9 of thirty-two days.

The two innermost rows of figures, which are shown at 11 and 12, respectively, are arranged to be read when near the lower edge of the card, that is, below the center thereof. These figures are intended to indicate the dates between which the woman is fertile, but it shall be understood that this period of so-called fertility may be lengthened in either direction, depending on many personal factors and the period of four days shown on the chart is to be considered merely as a guide for a normally functioning woman.

Looking at the scales shown in Figs. 1 to 4, the upper disc 2 is so arranged that when in position it covers all the various concentric rows except the outermost one, shown at 4. This movable disc has thereon a pointer 12 on or near the periphery thereof, which pointer may be used to designate any date on the outer row of figures. Aligned with this pointer in radial relation are suitable openings in this disc which are adapted to disclose only the figures of the various rows discussed above which correspond to the upper date designated by the indicator 12. Opening 13 will uncover a figure in row 6, opening 14 will uncover a figure in row 7, opening 15 will uncover a figure in row 8 and opening 16 will uncover a figure in row 9. Openings 17 and 18, shown below the center of the disc in Fig. 2, are designed to disclose corresponding figures in rows 11 and 12.

Figure 5:
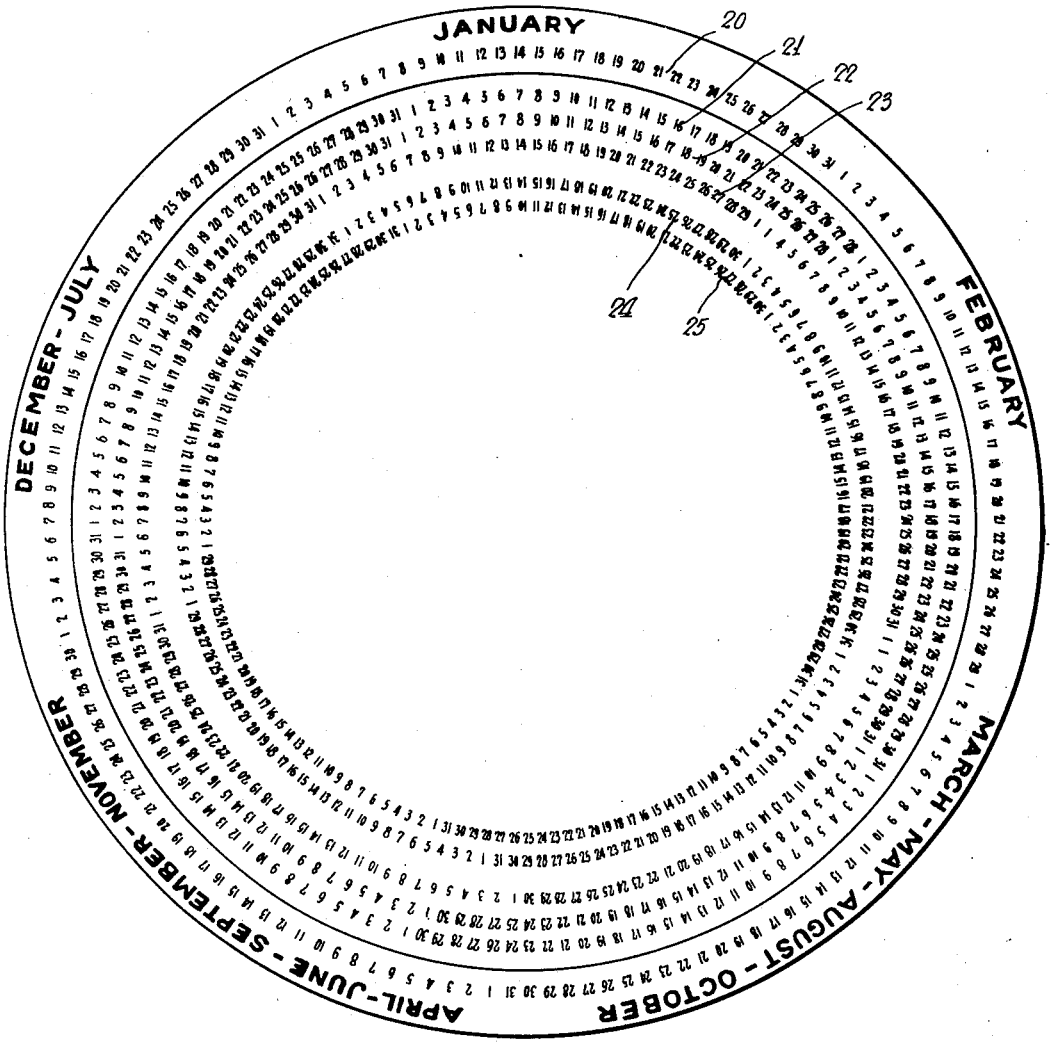
Fig. 5 is a plan view of the stationary disc of the scale showing the various rows of numbers thereon for a leap year.

The stationary disc illustrated in Fig. 5 is similar to the one shown in Fig. 4 except that the dates are arranged for a leap year, and instead of showing four rows of figures for four different lengths of cycles of menstruation, only three are shown. The outer row of figures designating the days of the year are shown at 20. The three rows designating the expected date for the next menses are shown at 21, 22 and 23 and are arranged for cycles of 25, 26 and 32 days, respectively. The two innermost rows of figures, shown at 24 and 25, designate the intervening period of fertility.

Figure 6:
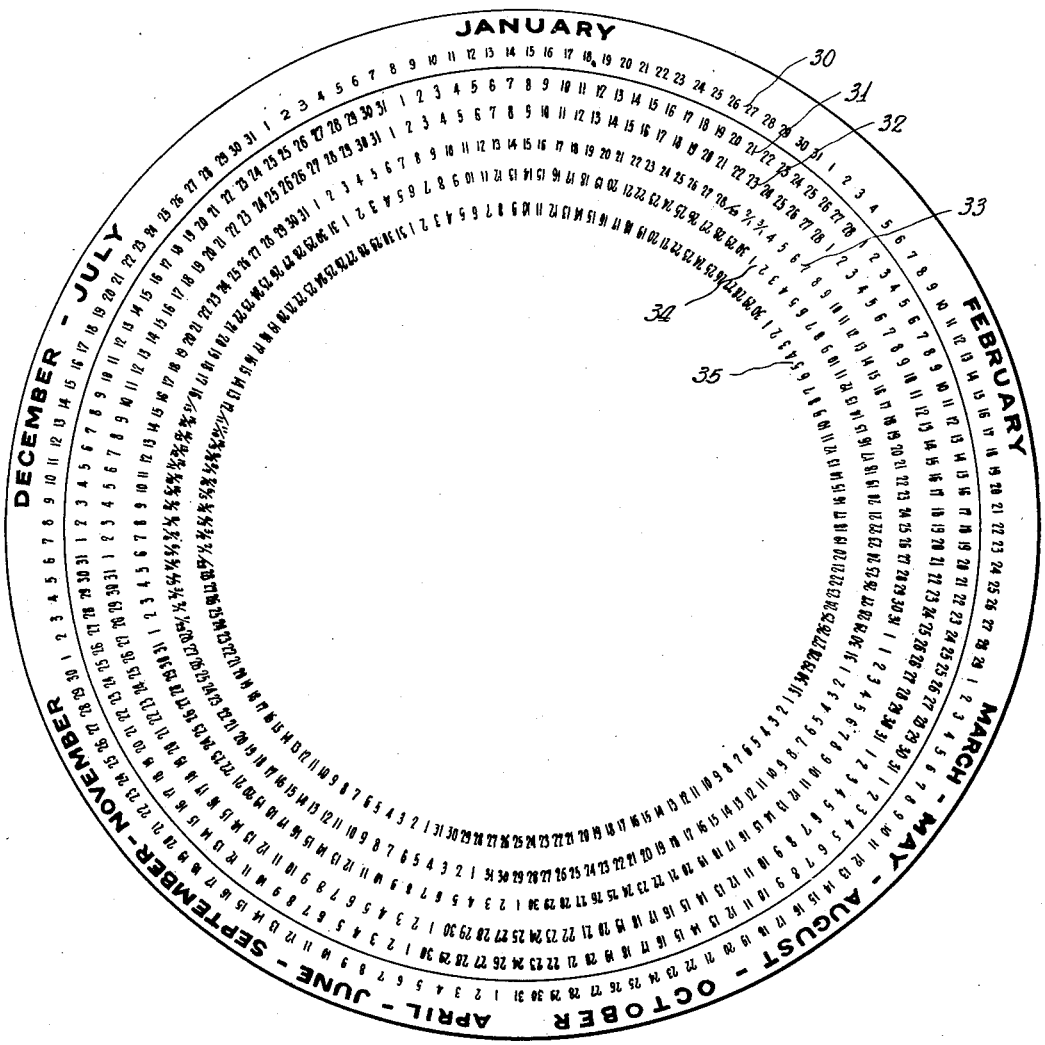
Fig. 6 is a plan view of the stationary disc of the scale showing the various rows of numbers thereon for either a leap year or a non-leap year.

Fig. 6 illustrates a stationary disc similar to that shown in Figs. 4 and 5 except that the numbers are arranged so that it may be used on either a leap year or a non-leap year. As in Fig. 5, the outermost row, shown at 30, designates the days of the year. The next three rows, working inwardly, designate the dates of next expected periods of menstruation and are numbered respectively 31, 32 and 33 for 25, 26 and 32 day cycles, respectively. The two innermost rows, shown at 34 and 35, designate the intervening period of fertility. It will be noticed that certain spaces for dates contain two figures, one figure for a leap year and one for a non-leap year.

In operation, it is only necessary to rotate the movable disc until the pointer 12 is lined up with the date of the first day when the menses commence and the figures viewed through the openings 13, 14, 15 and 16 will designate the dates of the commencement of the next menstruation, depending on the length of the cycle. The figures which can be seen through the opening 17 and 18 will designate the period of fertility intervening between the two periods of menstruation. This period of fertility may be adjusted by the user to compensate for any irregularity in the menstrual cycle. If this cycle is longer than the normal cycle of twenty-eight days, two or three days may be added to the end of this fertile period. If it is shorter than the normal cycle, one or two days may be added to the beginning of this period.

It will be seen that this scale serves two purposes, which may be utilized together or separately. First, it serves to designate the date of the next period of menstruation and secondly, it serves to indicate the intervening period of fertility. If it is desired to construct a scale for only one or the other of these purposes, it is only necessary to omit the figures on the disc 1 and the openings on the movable disc 2, corresponding to the function which it is desired to omit. If the chart were to be used only to designate the next period of menstruation, the openings 17 and 18 on the movable disc would be omitted and the rows of figures shown at 11 and 12 on the stationary disc would be omitted. If it were desired to use the scale only for designating the period of fertility, the rows of figures shown at 6, 7, 8 and 9 on the stationary disc would be omitted and the corresponding openings 13, 14, 15 and 16 of the movable disc also omitted.

I claim:

1. In a device of the character described, a stationary disc having a row of figures around the periphery thereof indicating the days in the year, a plurality of rows of figures inside said first mentioned row indicating the date of the next expected menstruation, each row corresponding to a different length cycle of menstruation, a movable disc adapted to cover all but the outermost row of figures, a pointer on said movable disc adapted to be aligned with any figure in said outermost row, and aligned openings adapted to reveal only the figures in the other rows which correspond to the date in the outer row to which said pointer is set so that the date of the next menstruation is shown.

2. In a device of the character described, a stationary disc having a row of figures around the periphery thereof indicating the days in the year, a plurality of rows of figures inside said first mentioned row indicating the date of the next expected menstruation, each row corresponding to a different length cycle of menstruation, a movable disc adapted to cover all but the outermost row of figures, a pointer on said disc adapted to be aligned with any figure in said outermost row, aligned openings adapted to reveal only the figures in the other rows which correspond to the date in the outer row to which said pointer is set so that the date of the next menstruation is shown, rows of figures inside of said above mentioned rows for indicating the period of fertility between the menstrual periods, and an aligned opening in said movable disc to reveal the dates of said fertile period corresponding to the date at which said indicator is set on the first row of figures.

3. In a device of the character described, a stationary disc having thereon around the periphery thereof a row of figures representing each day in a leap year, a plurality of concentrically arranged rows adjacent to said last mentioned row, each of said rows representing dates spaced from the dates of the year by the length of different menstruation cycles, double figures in certain spaces in the last mentioned rows to indicate dates for leap year and non-leap year, and a movable disc on said stationary disc having openings therethrough radially aligned with a pointer on said disc.

4. In a device of the character described, a circular scale comprising a movable and a stationary disc, said stationary disc having concentrically disposed rows of dates arranged near the periphery thereof into five quadrants representing respectively the month of January, the month of February, the thirty day months, the months of December and July and the remaining thirty-one day months, an outermost row representing the days of the year, a plurality of rows adjacent to said outermost row, each row representing the dates spaced from corresponding dates on the first mentioned row by the number of days in a short, normal or long human menstrual period, and aligned apertures on said movable disc for uncovering only corresponding figures in each row of the stationary disc.

5. In a device of the character described, a circular scale comprising a movable and a stationary disc, said stationary disc having concentrically disposed rows of dates arranged near the periphery thereof into five quadrants representing respectively the month of January, the month of February, the thirty day months, the months of December and July and the remaining thirty-one day months, an outermost row representing the days of the year, a plurality of rows adjacent to said outermost row, each row representing the dates spaced from corresponding dates on the first mentioned row by the number of days in a short, normal or long human menstrual period, a pair of rows adjacent to and inside the last mentioned rows, the figures of which represent the dates of fertility corresponding to the corresponding menstruation dates on the outermost rows, and aligned apertures on said movable disc for uncovering only corresponding figures in each row of the stationary disc.

ARMANDO ARAUJO.